May 9, 1967 W. R. WHEELER 3,319,117
IONIZATION VACUUM GAUGE FOR USE IN THE $10^{-6}$ TO 1 TORR RANGE
Filed March 24, 1964
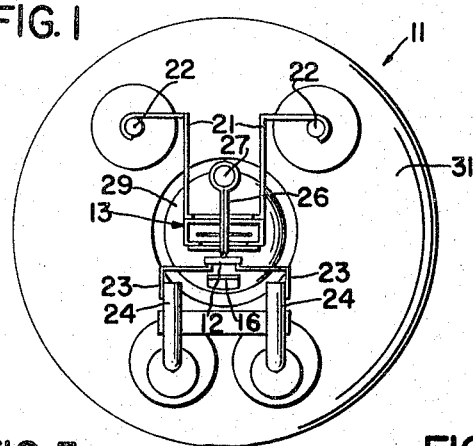
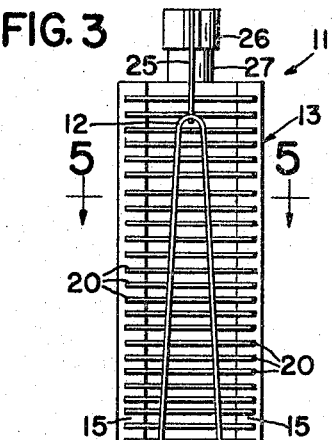
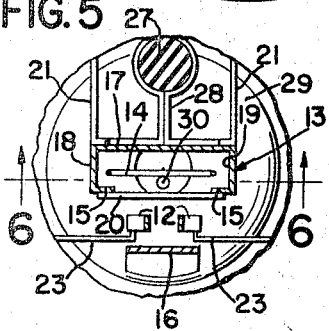
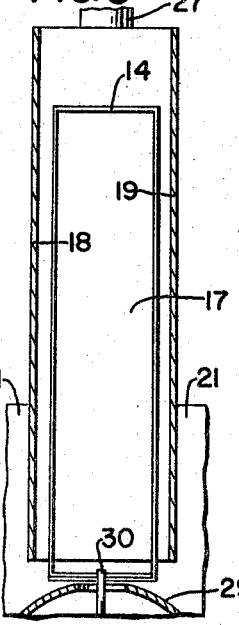
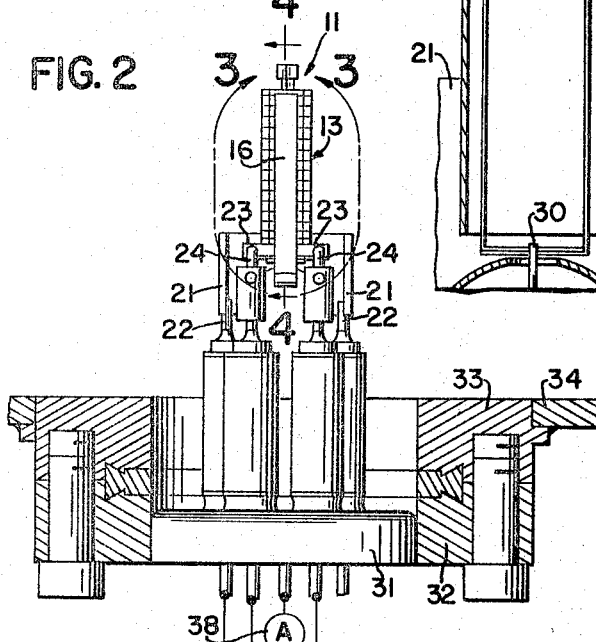
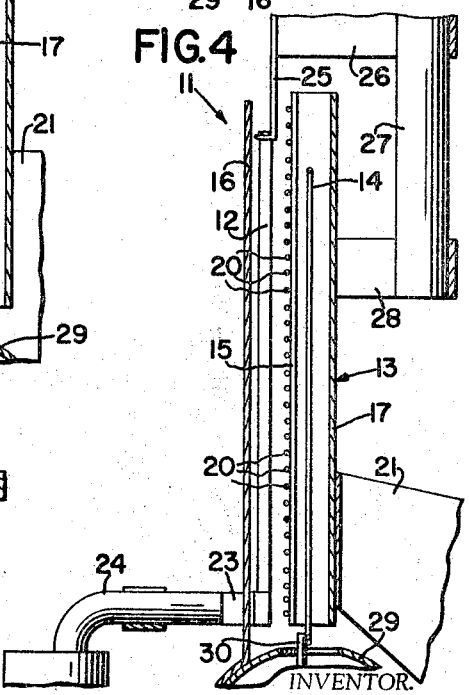
INVENTOR.
WILLIAM R. WHEELER
BY
ATTORNEY

3,319,117
IONIZATION VACUUM GAUGE FOR USE IN THE $10^{-6}$ TO 1 TORR RANGE

William R. Wheeler, Saratoga, Calif., assignor to Varian Associates, Palo Alto, Calif., a corporation of California
Filed Mar. 24, 1964, Ser. No. 354,386
10 Claims. (Cl. 315—111)

This invention relates to vacuum gauges and more particularly to ionization gauges for use in the $10^{-6}$ to 1 torr range.

Conventional ultra-high vacuum ionization gauges, for example, the Bayard-Alpert gauge, U.S. Patent 2,605,431, issued July 29, 1952, may not be used to pressures greater than $10^{-3}$ torr principally due to the nonlinearity at these higher pressures of the ion current vs. pressure curve. According to the teaching of U.S. Patent 2,963,601, issued Dec. 6, 1960, nonlinearity may be obviated if: (1) the electron paths are well defined and do not change appreciably with pressure; (2) the ion gauge sensitivity is small compared to the reciprocal of the highest pressure to be measured; and, (3), the ion collecting electrode is designed so that the efficency of ion collection does not change with pressure. In the commercial adaptation of this teaching, the so-called Schulz-Phelps gauge, and using a plane parallel geometry (see "Iionization Gauges for Measuring Pressures up to the Millimeter Range," by G. J. Schulz and A. V. Phelps, 28 R. Sci. Instr. #12, pp. 1051–54, December 1957), the filament is a thin straight wire, the ion collector is a flat plate closely spaced from and parallel to the filament and the electron collector is a flat plate parallel to the ion collector on the opposite side of the filament closely spaced therefrom.

It is, of course, desirable to extend the range of any vacuum gauge as much as possible. While under ideal experimental laboratory conditions it may be somewhat greater, ordinarily high pressure gauges such as the Schulz-Phelps gauge have a useful operating range of $1 \times 10^{-5}$ to $5 \times 10^{-1}$ torr. Different mechanisms limit operation of these gauges at the high and low ends of the range. For example, output becomes nonlinear above $10^{-1}$ torr because the total ion current produced is approaching the same magnitude as the electron current and the ion space charge around the ion collector is becoming significant. On the other hand, at the low end of the range, observable collector current does not fall below a certain minimum value due to a residual current to the ion collector completely unrelated to pressure.

It has been discovered that nonlinearity at the upper end of the range also arises from the fact that a portion of the ions produced in the gauge are attracted to the filament itself and flow through the filament-grid circuit. This current is completely negligible at low pressures, but as the pressure approaches 1 torr it becomes a significant percentage of the electron current which is being maintained, effectively reduces this current and thereby reduces the number of collected ions.

In accordance with the teachings of the present invention, an ionization gauge is constructed employing a fourth electrode or shield member. The fourth electrode is located near the filament, has a larger area than the filament and is maintained at a potential lower than the filament. With larger area as well as lower voltage than the filament, this fourth electrode is able to divert a large part of the ion current which would otherwise be drawn to the filament, and reduces the error due to nonlinearity at the upper end of the range by a factor of approximately 2.

It has been further discovered that the residual current to the ion collector in high pressure gauges at the low end of the range is mainly caused by ion emission from the filament.

In accordance with another teaching of the present invention the collector is electrostatically shielded from the filament thereby reducing residual current to the collector from the filament and extending the lower end of the range by at least 1 decade of pressure.

It is the object of the present invention to provide an improved ionization gauge having an extended pressure range.

One feature of the present invention is the provision in an ionization gauge of a fourth electrode for diverting ion current which might otherwise be drawn to the filament.

Another feature of the present invention is the provision of means for electrostatically shielding the collector from the filament.

These and other objects and features of the present invention and a further understanding may be had by referring to the following description and claims, taken in conjunction with the following drawing in which:

FIG. 1 is a top view of an ionization gauge employing the novel features of the present invention;

FIG. 2 is a side view of the ionization gauge of the present invention shown connected to the wall of a system whose pressure is being measured, and including the associated circuitry in schematic;

FIG. 3 is an enlarged view of the area delineated by the lines 3—3 of FIG. 2;

FIG. 4 is an enlarged cross-sectional view taken along the lines 4—4 of FIG. 2;

FIG. 5 is a cross-sectional view taken along the lines 5—5 of FIG. 3; and,

FIG. 6 is a cross-sectional view taken along the lines 6—6 of FIG. 5.

Referring now to the drawing, there is shown an ionization gauge 11 constructed in accordance with the teachings of the present invention. The gauge has a plurality of closely spaced electrodes including: an electron emitter 12; an electron collector 13; an ion collector 14; means 15 for electrostatically shielding the ion collector from positive ions emitted from the electron emitter 12 whereby residual current to the ion collector 14 at the low end of the pressure range is reduced; and, means 16 for diverting ions produced in the gauge away from the electron emitter 12 whereby nonlinearity at the upper end of the pressure range is substantially reduced. By closely spacing the electrodes the electron paths will be relatively short, typically not more than thirty times the mean free path for ionization.

In a preferred embodiment, the electron emitter or filament 12 is of the thermionic type made of thin strip thoria coated iridium .028" wide. The emitter has a hair pin configuration .90" high with legs spaced $\frac{5}{32}$" and its loop rounded to a radius of $\frac{1}{16}$".

The electron collector 13 is essentially an open-ended box-like member parallel to the electron emitter 12 being spaced therefrom .020" and comprising a rear planar portion 17 parallel to the electron emitter 12, two side walls 18, 19 and a front portion horizontally gridded by wire 20, for example, over its entire length and over a substantial portion of its width. That part of its front portion not gridded comprises a pair of vertical flange members integral with the side walls, 18, 19 which, in addition to supporting the grid portion, serve as the means 15 for electrostatically shielding the ion collector 14 from the electron emitter 12. Typically, the rear planar portion is 1.00" long, .270" wide, the side walls .073" wide and the flange members .055" wide forming an integral piece of platinum or stainless steel. The grid portion is made of 90% platinum-10% iridium, .005" wire spot welded over the means, being vertically spaced thereon .031".

The ion collector 14 is a rectangular loop of .008" tungsten wire located within the electron collector 13 being electrostatically shielded from the electron emitter by the means 15. The loop is .187" wide and .875" high being spaced midway between the front and rear portions of the electron collector parallel to the filament 12 and centrally aligned with the side walls 18, 19 of the electron collector 13.

The means 16 for diverting ions from the electron emitter 12 typically comprises a planar member of stainless steel disposed on the opposite side of the electron emitter 12 being parallel to and spaced therefrom .020". The dimensions of this planar member are approximately 3/16" wide and slightly longer that planar portion 17.

As best seen in FIGS. 1, 3 and 4 the electron collector 13 is supported on and rigidly held in place by a bracket member 21 which in turn is supported on electron collector lead-in wires 22, one of which is for support purposes only. The legs of the electron emitter 12 are supported on bracket holders 23 which in turn are supported on lead-in wires 24. The loop of the electron emitter is held by a hook 25, bracket 26, ceramic rod 27 and bracket 28 welded to electron collector 13. The means 16 for diverting ions is supported at its lower end by a grounded conductive sleeve member 29 used for shielding the collector lead-in wire 30. The collector lead-in wire 30 in turn supports the ion collector 14.

Referring to FIG. 2, the header assembly 30 through which the lead-in wires pass in vacuum tight manner is similar to the type shown and disclosed in U.S. Application Ser. No. 306,756, filed Sept. 5, 1963 and assigned to the same assignee as the present invention. The header is welded to a vacuum flange 32 and may be removably connected in vacuum tight manner to a mating flange 33 welded to the wall 34 of a system whose pressure is being measured.

In operation the ion collector 14 is essentially at ground, the electron emitter 12 is maintained at +45 volts with respect to ground by means of a power supply 35, and the electron collector 13 is maintained at +175 volts by means of a power supply 36. Power is supplied for heating the electron emitter 12 by means of a power supply 37, for example, 2–3 volts and 3–4 amperes. Ion current, hence pressure, is measured by means of an electrometer 38. The means 16 is at ground potential.

Electrons are emitted from the electron emitter 12 and are accelerated toward the electron collector 13. However, before collection, a certain number of these will form positive ions by collision with gas atoms. Positive ions are collected at the ion collector 14, the number collected being an index to molecular density, i.e. pressure.

By following the teachings of the present invention, a gauge may be constructed in which the electron paths are well defined and do not change appreciably with pressure, the sensitivity is very low (on the order of 0.5 torr$^{-1}$), the length of the electron paths are relatively short, and which is operable at a very low current (15–20 microamperes). In addition, it has been found that the location of a fourth electrode, preferably of large surface area, i.e., the means 16, close to the electron emitter 12 maintained at a potential lower than the potential of the electron emitter 12 reduces error due to nonlinearity at the upper end of the pressure range. Moreover, it has also been found that electrostatically shielding the ion collector 14 from the electron emitter 12, for example, by interposing a positive electrode in line of sight between electron emitter 12 and ion collector 14, i.e., the means 15, reduces residual current to the ion collector 14 at the lower end of the pressure range. By following the above teachings an ionization gauge has been constructed which provides an output signal which is linear from approximately $5 \times 10^{-6}$ to nearly 1 torr.

Since many changes can be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An ionization gauge for measuring low pressure including: an elongated filament for emitting electrons; an electron collector closely spaced to said filament, having a planar portion parallel to said filament and being maintained at a potential positive with respect to said filament; an elongated ion collector disposed between said filament and the planar portion of said electron collector, being parallel thereto and maintained at a potential negative with respect to said electron collector; means adjacent said filament for diverting ions from said filament; and, means disposed close to said filament being maintained at a potential positive with respect to said filament and having a planar portion parallel to said filament, for electrostatically shielding said filament from said ion collector.

2. The gauge according to claim 1 wherein, said electron collector includes sidewalls extending from the planar portion of said electron collector, said electrostatic shield means includes a pair of flange members parallel to said filament and integral with a respective one of the sidewalls of said electron collector, disposed in line-of-sight between said filament and said ion collector, and including grid means extending between said flange members over a substantial part of their length, thereby forming an open-ended box-like member surrounding said ion collector.

3. An ionization gauge for measuring low pressure including: an elongated filament for emitting electrons; an electron collector closely spaced to said filament, having a planar portion parallel to said filament and being maintained at a potential positive with respect to said filament; an elongated ion collector disposed between said filament and the planar portion of said electron collector, being parallel thereto and maintained at a potential negative with respect to said electron collector; and, means adjacent said filament for diverting ions from said filament, having a planar portion parallel to said filament, said ion diverting means being maintained at a potential negative with respect to said filament.

4. The gauge according to claim 3 wherein said ion diverting means and said ion collector are disposed on opposite sides of said filament.

5. A gauge according to claim 1 wherein said diverting means includes a planar portion parallel to said filament, being maintained at a potential negative with respect to said filament.

6. An ionization gauge including: a first electrode for collecting ions; a second electrode for collecting electrons maintained at a potential positive with respect to the ion collector; a third electrode for emitting electrons maintained at a potential intermediate the potential of the ion collector and the electron collector, the electrodes being closely spaced, and substantially solid elongated means coextensive with the ion collector and disposed substantially in the line of sight between said ion collector and said emitter for electrostatically shielding said ion collector from said emitter.

7. An ionization gauge according to claim 6 in which said second electrode comprises a box having three solid walls and a fourth non-solid gridded wall, said first electrode is positioned in said box, and said third electrode is positioned outside said box in front of said non-solid wall, and said shielding means is longitudinally positioned along the side portions of said non-solid wall.

8. An ionization gauge for measuring gas pressure including: a first electrode for collecting ions; a second electrode for collecting electrons; a third electrode for emitting electrons; and means adjacent said third electrode for diverting ions from said third electrode, said ion diverting means and said first electrode being disposed on opposite sides of said third electrode.

9. An ionization gauge for measuring low pressure including: a first electrode for collecting ions; a second electrode for collecting electrons, being maintained at a potential positive with respect to said first electrode; a third electrode for emitting electrons, being maintained at a potential intermediate the potential of the first and second electrodes, said electrodes being closely spaced; and means adjacent said third electrode for diverting ions from said third electrode, said ion diverting means being maintained at a potential negative with respect to said third electrode, and said ion diverting means and said first electrode being disposed on opposite sides of said third electrode.

10. An ionization gauge for measuring gas pressure including: a first electrode for collecting ions; a second electrode for collecting electrons; a third electrode for emitting electrons; and means adjacent said third electrode for diverting ions from said third electrode, said ion diverting means and said third electrode being both disposed on the same side of said electron collector.

References Cited by the Examiner

UNITED STATES PATENTS 3,267,326  8/1966  Hayward et al. _____ 315—108 X

FOREIGN PATENTS 136,039  1/1950  Australia.

OTHER REFERENCES

"Ionization Gauges for Measuring Pressures up to the Millimeter Range," by G. J. Shulz and A. V. Phelps, Review of Scientific Instruments, vol. 28, No. 12, pp. 1051–54, December 1957. Q184.R5.

JAMES W. LAWRENCE, *Primary Examiner.*

S. A. SCHNEEBERGER, *Assistant Examiner.*